(12) United States Patent
Takimoto et al.

(10) Patent No.: US 12,306,053 B2
(45) Date of Patent: May 20, 2025

(54) STRAIN GAUGE INCLUDING A BARRIER LAYER OVER A RESISTANCE BODY

(71) Applicant: MINEBEA MITSUMI Inc., Nagano (JP)

(72) Inventors: Tatsuya Takimoto, Nagano (JP); Shintaro Takata, Nagano (JP); Shinya Toda, Nagano (JP); Toshiaki Asakawa, Nagano (JP); Shigeyuki Adachi, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/261,351

(22) PCT Filed: Jan. 13, 2022

(86) PCT No.: PCT/JP2022/000985
§ 371 (c)(1),
(2) Date: Jul. 13, 2023

(87) PCT Pub. No.: WO2022/154057
PCT Pub. Date: Jul. 21, 2022

(65) Prior Publication Data
US 2023/0400370 A1    Dec. 14, 2023

(30) Foreign Application Priority Data
Jan. 18, 2021    (JP) .................. 2021-005495

(51) Int. Cl.
*G01L 1/22*    (2006.01)
(52) U.S. Cl.
CPC .................. *G01L 1/2287* (2013.01)

(58) Field of Classification Search
CPC ...................................... G01L 1/2287
USPC ...................................... 73/862.627
See application file for complete search history.

(56) References Cited

U.S. PATENT DOCUMENTS

| | | | |
|---|---|---|---|
| 4,307,371 A | 12/1981 | Ort | |
| 5,631,622 A | 5/1997 | Hauber et al. | |
| 11,262,181 B2 * | 3/2022 | Toda | G01B 7/18 |
| 11,326,967 B2 * | 5/2022 | Toda | G01D 21/02 |
| 11,499,877 B2 * | 11/2022 | Misaizu | G01L 1/22 |
| 11,542,590 B2 * | 1/2023 | Asakawa | C23C 14/0063 |

(Continued)

FOREIGN PATENT DOCUMENTS

| | | | | |
|---|---|---|---|---|
| CN | 201266074 Y | | 7/2009 | |
| CN | 1648626 B | * | 1/2011 | G01G 3/1402 |

(Continued)

OTHER PUBLICATIONS

International Search Report of Int. Appl. No. PCT/JP2022/000985 dated Mar. 29, 2022.

(Continued)

*Primary Examiner* — Octavia Hollington
(74) *Attorney, Agent, or Firm* — IPUSA, PLLC

(57) ABSTRACT

A strain gauge includes a flexible substrate; a resistor made from a film containing Cr, CrN, and Cr2N, on one surface of the substrate; and a resin barrier layer covering the resistor, and, in this strain gauge, in the barrier layer, a ratio of a moisture permeability (g/m2/24h) to a thickness (mm) is 5:1 or greater, and the thickness of the barrier layer is 100 μm or more and 3 mm or less.

10 Claims, 6 Drawing Sheets

(56) References Cited

U.S. PATENT DOCUMENTS

| | | | |
|---|---|---|---|
| 11,543,308 B2* | 1/2023 | Yuguchi | H01C 7/006 |
| 11,543,309 B2* | 1/2023 | Misaizu | G01L 1/2287 |
| 11,702,730 B2* | 7/2023 | Asakawa | G01B 7/16 |
| | | | 73/1.15 |
| 11,747,225 B2* | 9/2023 | Asakawa | G01L 1/2287 |
| | | | 73/862.627 |
| 11,774,303 B2* | 10/2023 | Kitamura | G01B 7/20 |
| | | | 73/849 |
| 11,786,125 B2* | 10/2023 | Mikhail | A61B 90/06 |
| | | | 600/587 |
| 2005/0163461 A1 | 7/2005 | Ziebart et al. | |
| 2019/0265015 A1 | 8/2019 | Michiwaki | |
| 2020/0292294 A1* | 9/2020 | Misaizu | H01C 1/14 |
| 2021/0018307 A1* | 1/2021 | Toda | G01L 1/22 |
| 2021/0033476 A1* | 2/2021 | Toda | G01B 7/18 |
| 2021/0063133 A1* | 3/2021 | Misaizu | G01B 7/20 |
| 2021/0131886 A1* | 5/2021 | Toda | G01L 1/2287 |

FOREIGN PATENT DOCUMENTS

| | | | | |
|---|---|---|---|---|
| CN | 107436123 | | 12/2017 | |
| EP | 3705840 A1 | * | 9/2020 | G01B 7/20 |
| JP | H06-109411 | | 4/1994 | |
| JP | 2005-214970 | | 8/2005 | |
| JP | 2016-074934 | | 5/2016 | |
| JP | 2018-040777 | | 3/2018 | |
| JP | 2019132790 A | * | 8/2019 | G01B 7/18 |
| WO | WO-2019088112 A1 | * | 5/2019 | G01B 7/20 |
| WO | WO-2019124458 A1 | * | 6/2019 | G01B 7/16 |
| WO | WO-2019244990 A1 | * | 12/2019 | |

OTHER PUBLICATIONS

Office Action mailed on Oct. 14, 2023 issued respect to the corresponding Chinese patent application No. 202280010336.9.

* cited by examiner

STRAIN GAUGE INCLUDING A BARRIER LAYER OVER A RESISTANCE BODY

TECHNICAL FIELD

The present disclosure relates to a strain gauge.

BACKGROUND ART

Conventionally, a strain gauge is attached to an object to be measured, and the strain of the measurement object is detected. The strain gauge has a resistor for detecting strain, and the resistor is formed, for example, on insulating resin. The resistor is connected to an electrode via a conductive trace, for example (see Patent Document 1, for example).

CITATION LIST

Patent Document

Patent Document 1: Japanese Unexamined Patent Application Publication No. 2016-74934

SUMMARY OF THE INVENTION

Problem to be Solved by the Invention

With a strain gauge such as the one described above, stability becomes a problem due to leakage current when used underwater or in a water-splashing environment. In particular, when the strain gauge has a high gauge factor, leakage current has a significant impact, and the output voltage varies.

The present disclosure has been prepared in view of the above, and it is therefore an object of the present disclosure to provide a strain gauge that can reduce the variation of output voltage due to the impact of leakage current.

Means for Solving the Problem

The strain gauge according to the present disclosure includes: a flexible substrate; a resistor made from a film containing Cr, CrN, and $Cr_2N$, on one surface of the substrate; and a resin barrier layer covering the resistor, and, in this strain gauge, in the barrier layer, a ratio of a moisture permeability ($g/m^2/24$ h) to a thickness (mm) is 5:1 or greater, and the thickness of the barrier layer is 100 µm or more and 3 mm or less.

Advantageous Effects of the Invention

According to the technique disclosed herein, it is possible to provide a strain gauge that can reduce the variation of output voltage due to the impact of leakage current.

EMBODIMENTS FOR CARRYING OUT THE INVENTION

An embodiment of the present disclosure will be described below with reference to the accompanying drawings. In each drawing, the same components will be assigned the same reference signs, and redundant description will be omitted.

First Embodiment

Figure 1:
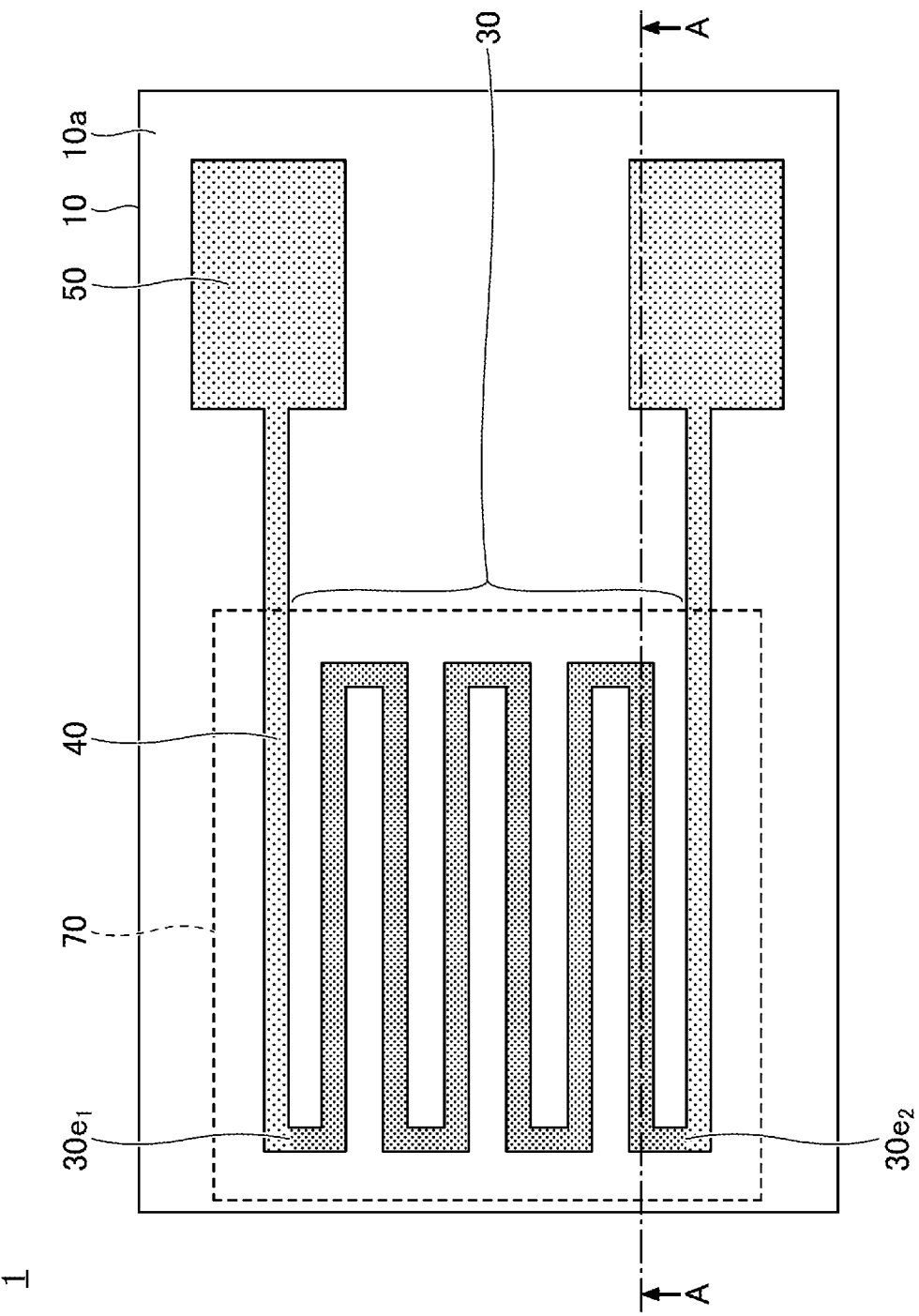
FIG. 1 is a plan view of an example of a strain gauge according to a first embodiment.
Figure 2:
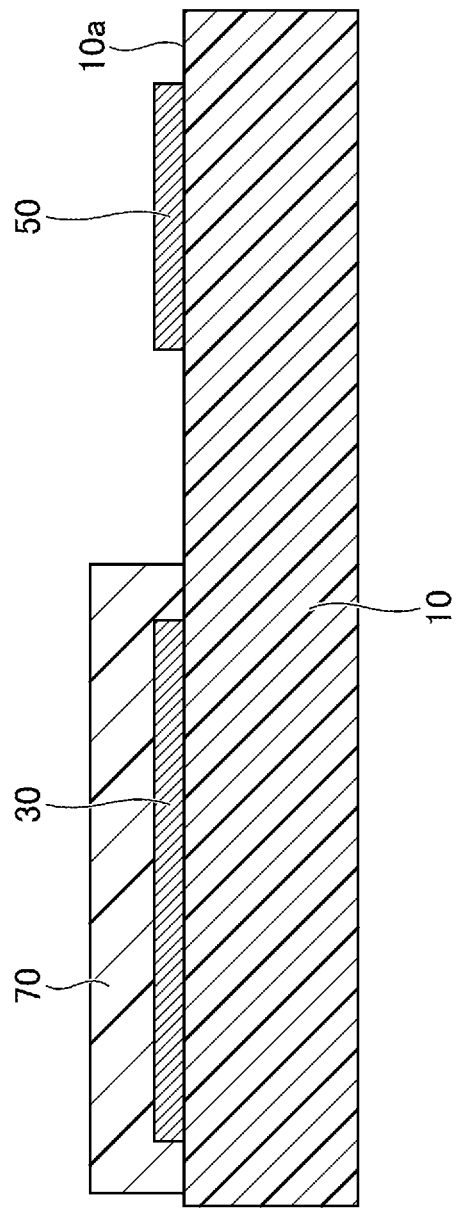
FIG. 2 is a cross-sectional view (example 1) that illustrates an example of the strain gauge according to the first embodiment.

FIG. 1 is a plan view that illustrates a strain gauge according to a first embodiment. FIG. 2 is a cross-sectional view that illustrates the strain gauge according to the first embodiment, showing a cross-section along line A-A in FIG. 1. Referring to FIG. 1 and FIG. 2, a strain gauge 1 has a substrate 10, a resistor 30, conductive traces 40, electrodes 50, and a barrier layer 70.

Note that, with the present embodiment, for ease of explanation, the side of the substrate 10 in the strain gauge 1 on which the resistor 30 is provided will be referred to as "the upper side" or "one side," and the side of the substrate 10 on which the resistor 30 is not provided will be referred to as "the lower side" or "the other side." Furthermore, in each component or part, the surface on the side where the resistor 30 is provided will be referred to as "one surface" or "the upper surface," and the surface on the side where the resistor 30 is not provided will be referred to as "the other surface" or "the lower surface." However, the strain gauge 1 can be used upside down, or can be disposed at any angle. Furthermore, plan view herein means that an object is viewed in a direction normal to an upper surface 10a of the substrate 10, and plan shape herein refers to the shape of an object as viewed in a direction normal to the upper surface 10a of the substrate 10.

The substrate 10 is a member that serves as a base layer for forming the resistor 30 and the like, and is flexible. The thickness of the substrate 10 is not particularly limited and can be selected in accordance with the purpose of use. For example, the substrate 10 may be approximately 5 µm to 500 µm thick. In particular, it is preferable if the substrate 10 is 5 µm to 200 µm thick, because the transmission of strain from the surface of the strain generating body joined to the lower surface of the substrate 10 via a bonding layer or the like, the dimensional stability in the environment, and so forth are excellent. It is even more preferable if the substrate is 10 µm thick or more because the insulation is excellent.

The substrate 10 can be formed from an insulating resin film made of, for example, a polyimide (PI) resin, an epoxy resin, a polyether ether ketone (PEEK) resin, a polyethylene naphthalate (PEN) resin, a polyethylene terephthalate (PET) resin, a polyphenylene sulfide (PPS) resin, a liquid crystal polymer (LCP) resin, a polyolefin resin, and so forth. Note that a film herein refers to a flexible member that is approximately 500 µm thick or less.

Here, "the substrate 10 can be formed from an insulating resin film" by no means precludes the substrate 10 from containing fillers, impurities, and so forth, in the insulating resin film. The substrate 10 may be formed from, for example, an insulating resin film that contains fillers such as silica or alumina.

Examples of materials of the substrate 10 other than resin include crystalline materials such as $SiO_2$, $ZrO_2$ (including YSZ), Si, $Si_2N_3$, $Al_2O_3$ (including sapphire), ZnO, perovskite ceramics ($CaTiO_3$, $BaTiO_3$, etc.) and so forth. Further, additional examples include amorphous glass and the like. Furthermore, as materials of the substrate 10, metals such as aluminum, an aluminum alloy (duralumin), titanium, and others may be used. In this case, for example, an insulating film is formed on the substrate 10 of metal.

The resistor 30 is a thin film formed on the substrate 10 in a predetermined pattern, and is a sensitive part configured such that that resistance changes in response to strain. The resistor 30 may be formed directly on the upper surface 10$a$ of the substrate 10, or may be formed on the upper surface 10$a$ of the substrate 10 via other layers. Note that, in FIG. 1, the resistor 30 is shown with a dark satin pattern for ease of explanation.

The resistor 30 has a plurality of elongated portions, arranged at predetermined intervals with their longitudinal directions oriented in the same direction (the direction of line A-A in FIG. 1), and the ends of adjacent elongated portions are alternately connected to form a zigzag structure on the whole. The longitudinal direction of the elongated portions is the grid direction, and the direction perpendicular to the grid direction is the grid width direction (the direction of line B-B in FIG. 1).

Ends of the two elongated parts in the longitudinal direction, located on the outermost side in the grid width direction, are bent in the grid width direction, and form respective ends 30$e_1$ and 30$e_2$ of the resistor 30 in the grid width direction. The ends 30$e_1$ and 30$e_2$ of the resistor 30 in the grid width direction are electrically connected with the electrodes 50 via the conductive traces 40. In other words, the conductive traces 40 electrically connect the ends 30$e_1$ and 30$e_2$ of the resistor 30 in the grid width direction with respective electrodes 50.

The resistor 30 can be made of, for example, a material containing Cr (chromium), a material containing Ni (nickel), or a material containing both Cr and Ni. That is, the resistor 30 can be made of a material containing at least one of Cr and Ni. Materials containing Cr include, for example, a Cr composite film. Materials containing Ni include, for example, Cu—Ni (copper nickel). Materials containing both Cr and Ni include, for example, Ni—Cr (nickel chromium).

Here, a Cr composite film refers to a composite film of Cr, CrN, $Cr_2N$, and the like. A Cr composite film may contain incidental impurities such as chromium oxide.

The thickness of the resistor 30 is not particularly limited and can be selected in accordance with the purpose of use. The resistor 30 can be, for example, approximately 0.05 μm to 2 μm thick. In particular, it is preferable if the resistor 30 is 0.1 μm thick or more, because the crystallinity of crystals (for example, the crystallinity of α-Cr) constituting the resistor 30 improves. It is even more preferable if the resistor 30 is 1 μm thick or less, because the cracks in the film constituting the resistor 30 due to the film's internal stress, and the warping of the film from the substrate 10 can be reduced. The width of the resistor 30 may preferably be optimized in accordance with the required specifications such as the resistance value and the lateral sensitivity, and be set to, for example, approximately 10 μm or more and 100 μm or less, as a countermeasure against disconnections.

For example, if the resistor 30 is a Cr composite film, the stability of gauge characteristics can be improved by using α-Cr (alpha-chromium), which has a stable crystalline phase, as the main component. Additionally, when the resistor 30 contains α-Cr as its main component, the strain gauge 1 can have a gauge factor of 10 or higher, as well as a gauge factor temperature coefficient TCS and a resistance temperature coefficient TCR in the range of −1,000 ppm/degrees Celsius to +1,000 ppm/degrees Celsius. Here, "the main component" means that the substance of interest takes up 50% or more, by weight, of all substances constituting the resistor. It is preferable if the resistor 30 contains 80% or more of α-Cr by weight, and more preferable if the resistor 30 contains 90% or more of α-Cr by weight, from the perspective of improving the gauge characteristics. Note that α-Cr is a Cr having a body-centered cubic structure (bcc structure).

Also, when the resistor 30 is a Cr composite film, the CrN and $Cr_2N$ contained in the Cr composite film are preferably 20% or less by weight. When the CrN and $Cr_2N$ contained in the Cr composite film are 20% or less by weight, the decrease in the gauge ratio can be reduced.

Furthermore, the proportion of $Cr_2N$ in CrN and $Cr_2N$ is preferably 80% or more by weight and less than 90% by weight, and, more preferably, 90% or more by weight and less than 95% by weight. When the proportion of $Cr_2N$ in CrN and $Cr_2N$ is 90% or more by weight and less than 95% by weight, $Cr_2N$, which has semiconductor-like properties, makes the decrease of TCR (negative TCR) more noticeable. Furthermore, reduced use of ceramic materials enables the reduction of brittle fracture as well.

Meanwhile, when a small amount of $N_2$ or atomic N gets mixed or is present in the film, the external environment (for example, high temperature environment) might make them escape from the film, which might result in a change in the film stress. By creating a chemically stable CrN, a stable strain gauge can be obtained without generating the above unstable N.

The conductive traces 40 are formed on the substrate 10. The electrodes 50 are formed on the substrate 10, and electrically connected to the resistor 30 via the conductive traces 40. For example, the electrodes 50 are wider than the conductive traces 40 and formed in a substantially rectangular shape. The electrodes 50 are a pair of electrodes for outputting the strain-induced changes in the resistance value of the resistor 30 to the outside, and are connected to lead wires for external connection, for example. In FIG. 1, for ease of explanation, the conductive traces 40 and the electrodes 50 are shown with a satin pattern that is sparser than that of the resistor 30.

Note that the resistor 30, the conductive traces 40, and the electrodes 50 are assigned different reference signs for ease of explanation, but they can be formed integrally from the same material through the same process. Therefore, the resistor 30, the conductive traces 40, and the electrodes 50 have substantially the same thickness.

The upper surfaces of the conductive traces 40 and the electrodes 50 may be covered by a metal that is made of a material having a lower resistance than the conductive traces 40 and the electrodes 50. For example, when the resistor 30, the conductive traces 40, and the electrodes 50 are a Cr composite film, the metallic material having a lower resistance than the Cr composite film may be Cu, Ni, Al, Ag, Au, or Pt, an alloy of any of these metals, a compound of any of these metals, or a laminated film obtained by appropriately laminating any of these metals, alloys, or compounds.

The barrier layer 70 is provided to cover the resistor 30. The barrier layer 70 is a resin layer that is formed to reduce the leakage current that flows in the resistor 30, and is made from an insulating material. Note that, in the present disclosure, an insulating material refers to a material having a volume resistivity of 0.1 MΩ·m or more, preferably 1 MΩ·m or more.

With this barrier layer 70, the ratio of the moisture permeability (g/m$^2$/24 h) to the thickness (mm) is 5:1 or greater. For example, if the moisture permeability of the barrier layer 70 is 5 g/m$^2$/24 h, the thickness of the barrier layer 70 is 1 mm or more. If the moisture permeability of the barrier layer 70 is 0.5 g/m$^2$/24 h, the thickness of the barrier layer 70 is 0.1 mm (100 μm) or more. Furthermore, if the moisture permeability of the barrier layer 70 is 0.05 g/m$^2$/24 h, the thickness of the barrier layer 70 is 0.01 mm (10 μm) or more. The minimum thickness×(mm) of the barrier layer 70 is given by: the moisture permeability A (g/m$^2$/24 h) of the barrier layer material×the thickness B (mm) upon measurement of the moisture permeability A/a coefficient C. The coefficient C is a coefficient value for calculating the minimum thickness (mm) and is 5 (g/m$^2$/24 h).

In the present disclosure, the moisture permeability is the mass (g) of water vapor that permeates through a unit area (1 m$^2$) of the barrier layer 70 in 24 hours. Also, in the present disclosure, the moisture permeability is measured in an environment of 40 degrees Celsius and 90% RH, in accordance with the provisions of JIS Z0208.

Also, the thickness of the barrier layer 70, when determining its ratio to the moisture permeability, refers to the thickness of the portion of the barrier layer 70 that is in contact with the upper surface of the resistor 30. That is, it is the thickness of the barrier layer 70 measured from the upper surface of the resistor 30 in a direction normal to the upper surface of the resistor 30.

The material of the barrier layer 70 can be selected as appropriate, and the barrier layer 70 can be made from, for example, a fluoropolymer, an epoxy resin, or an acrylic resin, insofar as the ratio of the moisture permeability (g/m$^2$/24 h) to thickness (mm) is 5:1 or greater. The barrier layer 70 may have a laminated structure in which a plurality of layers of different materials are laminated. Alternatively, for example, a hybrid resin combining an epoxy resin and an acrylic resin may be used.

For example, if there is a risk of contact with chemicals, a fluoropolymer, which has high chemical resistance, is a suitable material for the barrier layer 70. An epoxy resin, which is excellent in heat resistance, is a suitable material for the barrier layer 70 when the strain gauge 1 used at a relatively high temperature. Furthermore, in the event the strain gauge 1 is used at a relatively low temperature, an acrylic resin, which can ensure flexibility even at low temperatures, is a suitable material for the barrier layer 70.

As described above, with the barrier layer 70, the ratio of the moisture permeability (g/m$^2$/24 h) to the thickness (mm) has only to be 5:1 or greater. However, even if there is a resin having a high moisture permeability, it does not necessarily mean that the resin can be used by simply making it thicker. If the barrier layer 70 becomes thicker, the cure-shrinkage stress and the like becomes a problem, and so it is necessary to keep the barrier layer 70 somewhat thin. Considering the cure-shrinkage stress and the like, the thickness of the barrier layer 70 is preferably 3 mm or less. Meantime, due to manufacturing limitations, the thickness of the barrier layer 70 is preferably 100 μm or more.

Thus, in the strain gauge 1, the resin barrier layer 70 is formed so as to cover the resistor 30, and, in the barrier layer 70, the ratio of the moisture permeability (g/m$^2$/24 h) and the thickness (mm) is 5:1 or greater, and its thickness is 100 μm or more and 3 mm or less.

By this means, even when the strain gauge 1 is used underwater or in a water-splashing environment, the barrier layer 70 suppresses the permeation of water vapor, so that the leakage current flowing in the resistor 30 can be reduced. As a result of this, in the strain gauge 1, the variations of output voltage due to the impact of leakage current can be reduced.

In particular, a highly sensitive strain gauge that uses a Cr composite film for the resistor 30 and that has a gauge factor of 10 or more is more sensitive than a conventional strain gauge having a gauge factor of less than 10, thus being more sensitive to the impact of moisture, and measurement errors and variations in the output voltage occur more often. Therefore, when the strain gauge uses a Cr composite film for the resistor 30 and has a gauge factor of 10 or more, it is particularly effective to form a barrier layer 70, in which the ratio of the moisture permeability (g/m$^2$/24 h), the thickness (mm) is 5:1 or greater, and the thickness of which is 100 μm or more and 3 mm or less, and which covers the resistor 30.

The barrier layer 70 is preferably provided so as to cover the upper surface and side surfaces of the resistor 30 in a continuous fashion. As a result of this, the effect of reducing the impact of moisture becomes greater than when the barrier layer 70 covers only the upper surface of the resistor 30. Nevertheless, insofar as the barrier layer 70 covers at least part of the resistor 30, a certain effect of reducing the impact of moisture can be achieved.

Figure 3:
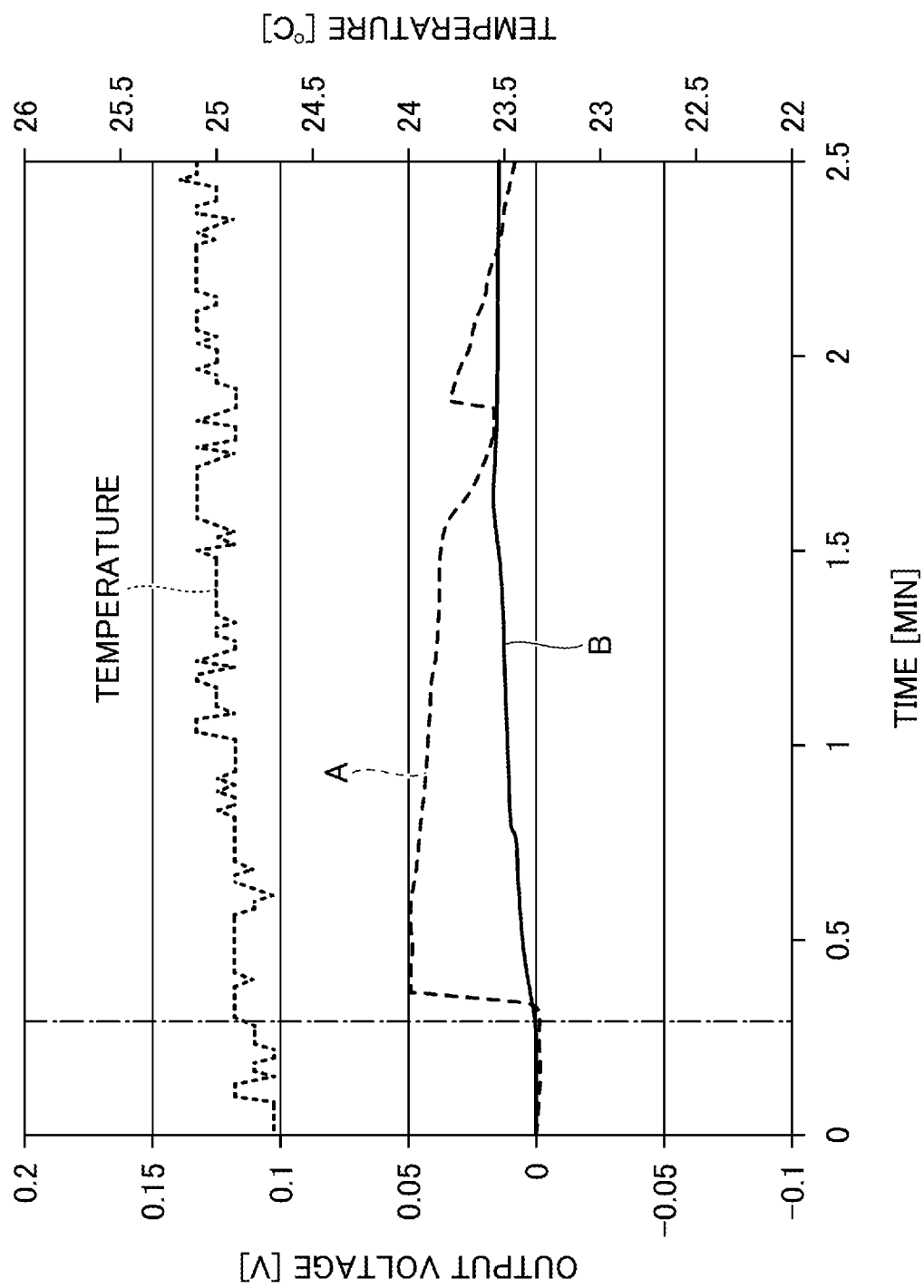
FIG. 3 shows an outcome of an experiment for confirming a leakage current reduction effect of a barrier layer.

FIG. 3 show an outcome of an experiment for confirming the leakage current reduction effect of the barrier layer. In FIG. 3, in test sample A, a strain gauge having the structure shown in FIG. 1 and FIG. 2 without the barrier layer 70 is used, while, in test sample B, the barrier layer 70 is provided as in the strain gauge 1 having the structure shown in FIG. 1 and FIG. 2.

In test samples A and B, a Cr composite film having a film thickness of 200 nm is used as the resistor 30. Also, in test sample B, an acrylic resin having a film thickness of 1 mm is used as the barrier layer 70. In this case, the ratio of the moisture permeability (g/m$^2$/24 h) and the thickness (mm) is 5:1.1.

In the experiment, after a certain period of time elapsed (the one-dot chain line in FIG. 3) and the measurement became stable, test samples A and B were sprayed with water by using a commercially-available pressurized spray, and were exposed to a water-splashing environment, and thereupon the changes in their output voltage were measured over time.

FIG. 3 shows that, with test sample A that does not have a barrier layer, when test sample A is exposed to moisture, the resistance value of the resistor drops due to the impact of leakage current, and a sharp rise in the output voltage can be seen. On the other hand, with test sample B having a barrier layer 70, an increase in the output voltage due to leakage current cannot be seen. Note that, with test sample B, the output voltage rises slowly, but this simply shows the same behavior as temperature changes and depends on the thermal characteristics (TCR) of the strain gauge, and the impact of moisture is unrelated.

The present inventors repeated the same experiment as shown in FIG. 3, and found out that, insofar as the ratio of the moisture permeability (g/m$^2$/24 h) and the thickness (mm) of the barrier layer 70 was 5:1 or greater, the output voltage did not rise sharply as in the case with test sample A, and exhibited the same behavior as temperature changes as in the case with test sample B. Furthermore, according to further studies by the present inventors, even when an epoxy resin and a fluoropolymer were used for the barrier layer 70, the same result as with test sample B in FIG. 3, which used an acrylic resin, was obtained.

To make the strain gauge 1, first, the substrate 10 is prepared, and a metal layer (referred to as a "metal layer" A for ease of explanation) is formed on the upper surface 10a of the substrate 10. The metal layer A is a layer that is ultimately patterned so as to serve as the resistor 30, the conductive traces 40, and the electrodes 50. Therefore, the material and the thickness of the metal layer A are the same as those of the resistor 30, the conductive traces 40, and the electrodes 50 described above.

The metal layer A can be formed, for example, by magnetron sputtering which uses, as a target, a raw material that can form the metal layer A. The metal layer A may be formed by using reactive sputtering, vapor deposition, arc ion plating, pulse laser deposition, and so forth, instead of magnetron sputtering.

From the perspective of achieving stable gauge characteristics, before forming the metal layer A, it is preferable to vacuum-form a functional layer of a predetermined thickness as an underlying layer, over the upper surface 10a of the substrate 10 by, for example, conventional sputtering.

In the present disclosure, a functional layer refers to a layer having a function of promoting the crystal growth of at least the upper metal layer A (resistor 30). The functional layer preferably further has a function of preventing oxidation of the metal layer A due to the oxygen and moisture contained in the substrate 10, a function of improving the adhesion between the substrate 10 and the metal layer A, and so forth. The functional layer may also have other functions as well.

The insulating resin film that constitutes the substrate 10 contains oxygen and moisture. In particular, when the metal layer A contains Cr, Cr forms a self-autoxidized film, and it is therefore effective if the functional layer has a function of preventing oxidation of the metal layer A.

The material of the functional layer is not particularly limited as long as it at least has a function of facilitating the crystal growth of the metal layer A (resistor 30), which is an upper layer, and can be selected in accordance with the purpose of use. The material may be, for example, one or more types of metals selected from the group consisting of Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum), an alloy of some of the metals in this group, or a compound of some of the metals in this group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

When the functional layer is formed from a conductive material such as a metal or an alloy, the film thickness of the functional layer is preferably 1/20 or less of the film thickness of the resistor. When the film thickness of the functional layer is in this range, it is possible to facilitate the crystal growth of α-Cr, and prevent a situation where part of the current flowing in the resistor flows into the functional layer and lowers the sensitivity of strain detection.

When the functional layer is formed from a conductive material such as a metal or an alloy, the film thickness of the functional layer is more preferably 1/50 or less of the film thickness of the resistor. When the film thickness of the functional layer is in this range, it is possible to facilitate the crystal growth of α-Cr, and prevent, more effectively, a situation where part of the current flowing in the resistor flows into the functional layer and lowers the sensitivity of strain detection.

When the functional layer is formed from a conductive material such as a metal or an alloy, the film thickness of the functional layer is even more preferably 1/100 or less of the film thickness of the resistor. When the film thickness of the functional layer is in this range, it is possible to prevent, even more effectively, a situation where part of the current flowing in the resistor flows into the functional layer and lowers the sensitivity of strain detection.

When the functional layer is formed from an insulating material such as an oxide or a nitride, the film thickness of the functional layer is preferably 1 nm to 1 μm. When the film thickness of the functional layer is in this range, it is possible to facilitate the crystal growth of α-Cr, and form a film with ease without forming cracks in the functional layer.

When the functional layer is formed from an insulating material such as an oxide or a nitride, the film thickness of the functional layer is more preferably 1 nm to 0.8 μm. When the film thickness of the functional layer is in this range, it is possible to facilitate the crystal growth of α-Cr, and form a film even more easily without forming cracks in the functional layer.

When the functional layer is formed from an insulating material such as an oxide or a nitride, the film thickness of the functional layer is even more preferably 1 nm to 0.5 μm. When the film thickness of the functional layer is in this range, it is possible to facilitate the crystal growth of α-Cr, and form a film even more easily without forming cracks in the functional layer.

Note that the plan shape of the functional layer is patterned substantially the same as the plan shape of the resistor illustrated in FIG. 1, for example. However, the plan shape of the functional layer does not necessarily have to be substantially the same as the plan shape of the resistor. When the functional layer is formed from an insulating material, it does not have to be patterned in the same shape as the plan shape of the resistor. In this case, the functional layer may be formed solidly at least in the region where the resistor is formed. Alternatively, the functional layer may be formed solidly over the entire upper surface of the substrate 10.

Also, when the functional layer is formed from an insulating material, the functional layer may be made relatively thick, such as 50 nm thick or more and 1 μm thick or less, and may be formed in a solid shape, so that the thickness and the surface area of the functional layer increase, and the heat that is generated when the resistor warms up can be readily dissipated to the substrate 10 side. As a result of this, with the strain gauge 1, it is possible to reduce the decrease of the accuracy of measurement due to the resistor's self-heating.

The functional layer can be vacuum-formed by, for example, conventional sputtering, in which a raw material that can form the functional layer is used as a target and an Ar (argon) gas is introduced into a chamber. By using conventional sputtering, the functional layer is formed while the upper surface 10a of the substrate 10 is being etched with Ar, and therefore it is possible to form the functional layer only in a minimal amount, and achieve an effect of improved adhesion.

However, this is simply one example of the method of forming the functional layer, and the functional layer may be formed by using other methods as well. For example, a method may be used here in which: before the functional layer is formed, the upper surface 10a of the substrate 10 is activated by plasma treatment using Ar or the like, so as to gain an adhesion improving effect; and subsequently, the functional layer is vacuum-formed by magnetron sputtering.

The combination of the material of the functional layer and the material of the metal layer A is not particularly limited and can be selected in accordance with the purpose of use. For example, it is possible to form a Cr composite film by using Ti as the main component of the functional layer and α-Cr (alpha-chromium) as the main component of the first metal layer.

In this case, the first metal layer can be formed by magnetron sputtering, in which a raw material that can form a Cr composite film is used as a target, and an Ar gas is introduced into a chamber. Alternatively, reactive sputtering, which targets pure Cr and introduces an appropriate amount of nitrogen gas into a chamber with an Ar gas, may be used to form the metal layer A. In this case, by changing the amount and pressure (nitrogen partial pressure) of nitrogen gas to be introduced, adjusting the heating temperature by providing a heating step, and so forth, it is possible to adjust the proportions of CrN and $Cr_2N$ contained in the Cr composite film, as well as the proportion of $Cr_2N$ in CrN and $Cr_2N$.

According to these methods, the growth surface of the Cr composite film is defined based on the functional layer consisting of Ti, and a Cr composite film, in which α-Cr having a stable crystalline structure is the main component, can be formed. Also, Ti that constitutes the functional layer is diffused in the Cr composite film, so that improved gauge characteristics can be gained. For example, the gauge factor of the strain gauge 1 can be made 10 or more, and the gauge factor temperature coefficient TCS and the resistance temperature coefficient TCR can be kept in the range of −1,000 ppm/degrees Celsius to +1,000 ppm/degrees Celsius. Note that, when the functional layer is formed from Ti, the Cr composite film might contain Ti or TiN (titanium nitride).

Note that, when the metal layer A is a Cr composite film, the functional layer consisting of Ti has all of: the function of facilitating the crystal growth of the metal layer A; the function of preventing oxidation of the metal layer A due to the oxygen or moisture contained in the substrate 10; and the function of improving the adhesion between the substrate 10 and the metal layer A. The same applies when Ta, Si, Al, or Fe is used for the functional layer, instead of Ti.

In this way, by providing a functional layer in a lower layer of the metal layer A, it becomes possible to facilitate the crystal growth of the metal layer A, and fabricate a first metal layer consisting of a stable crystalline phase. As a result of this, the stability of gauge characteristics in the strain gauge 1 can be improved. Furthermore, since the material to constitute the functional layer is diffused in the metal layer A, the strain gauge 1 can have improved gauge characteristics.

Next, the metal layer A is patterned by photolithography, and the flat resistor 30, conductive traces 40, and electrodes 50 shown in FIG. 1 are formed.

Figure 4:
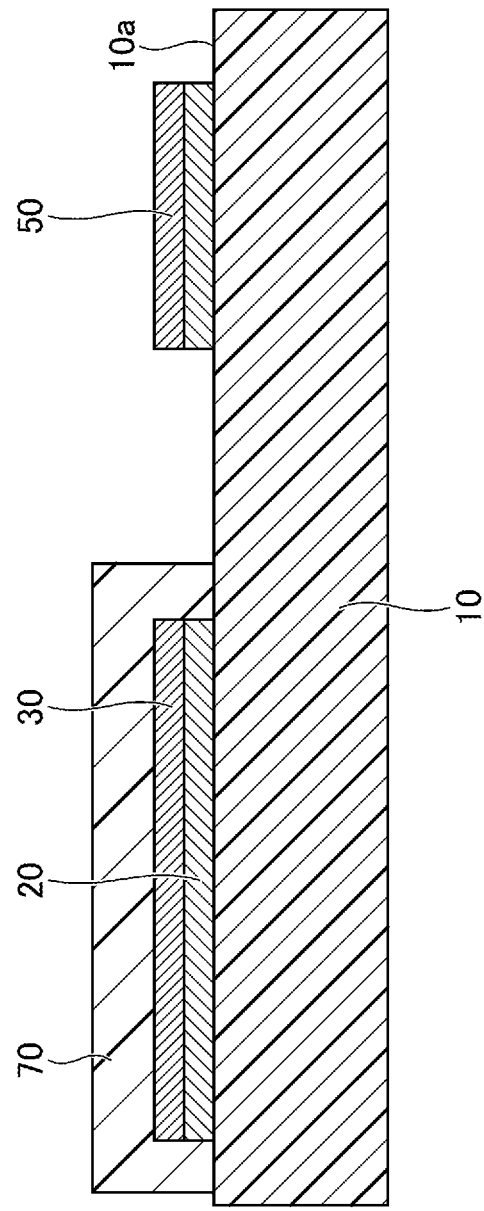
FIG. 4 is a cross-sectional view (example 2) that illustrates an example of the strain gauge according to the first embodiment.

Note that, when a functional layer is provided on the upper surface 10a of the substrate 10 as a base layer for the resistor 30, the conductive traces 40, and the electrodes 50, the strain gauge 1 has the cross-sectional shape shown in FIG. 4. The layer denoted by the reference sign 20 is the functional layer. The plan shape of the strain gauge 1 when the functional layer 20 is provided is, for example, the same as that shown in FIG. 1. However, as described above, the functional layer 20 may be formed solidly in part or all of the upper surface of the substrate 10.

Next, a barrier layer 70 is formed on the upper surface 10a of the substrate 10 so as to cover the resistor 30 and expose the electrodes 50. As long as the barrier layer 70 covers at least the resistor 30, the barrier layer 70 may additionally cover part or all of the conductive traces 40. The material and thickness of the barrier layer 70 are as described above. Note that, in FIG. 1, the barrier layer 70 is formed so as to cover part of the conductive traces 40.

The method of forming the barrier layer 70 is not particularly limited and can be selected as appropriate depending on the purpose of use. For example, the barrier layer 70 may be produced by laminating a semi-hardened thermosetting insulating resin film over the upper surface 10a of the substrate 10, so as to cover the resistor 30 and expose the electrodes 50, and then by heating and hardening the laminate. Alternatively, the barrier layer 70 may be produced by applying a liquid or paste thermosetting insulating resin to the upper surface 10a of the substrate 10, so as to cover the resistor 30 and expose the electrodes 50, and then by heating and hardening the resin. Through the above steps, the strain gauge 1 is completed.

Modification 1 of the First Embodiment

A modification 1 of the first embodiment shows an example in which a stress relaxing layer is provided in the strain gauge. Note that, in modification 1 of the first embodiment, the description of the same components as in the above-described embodiment may be omitted.

Figure 5:
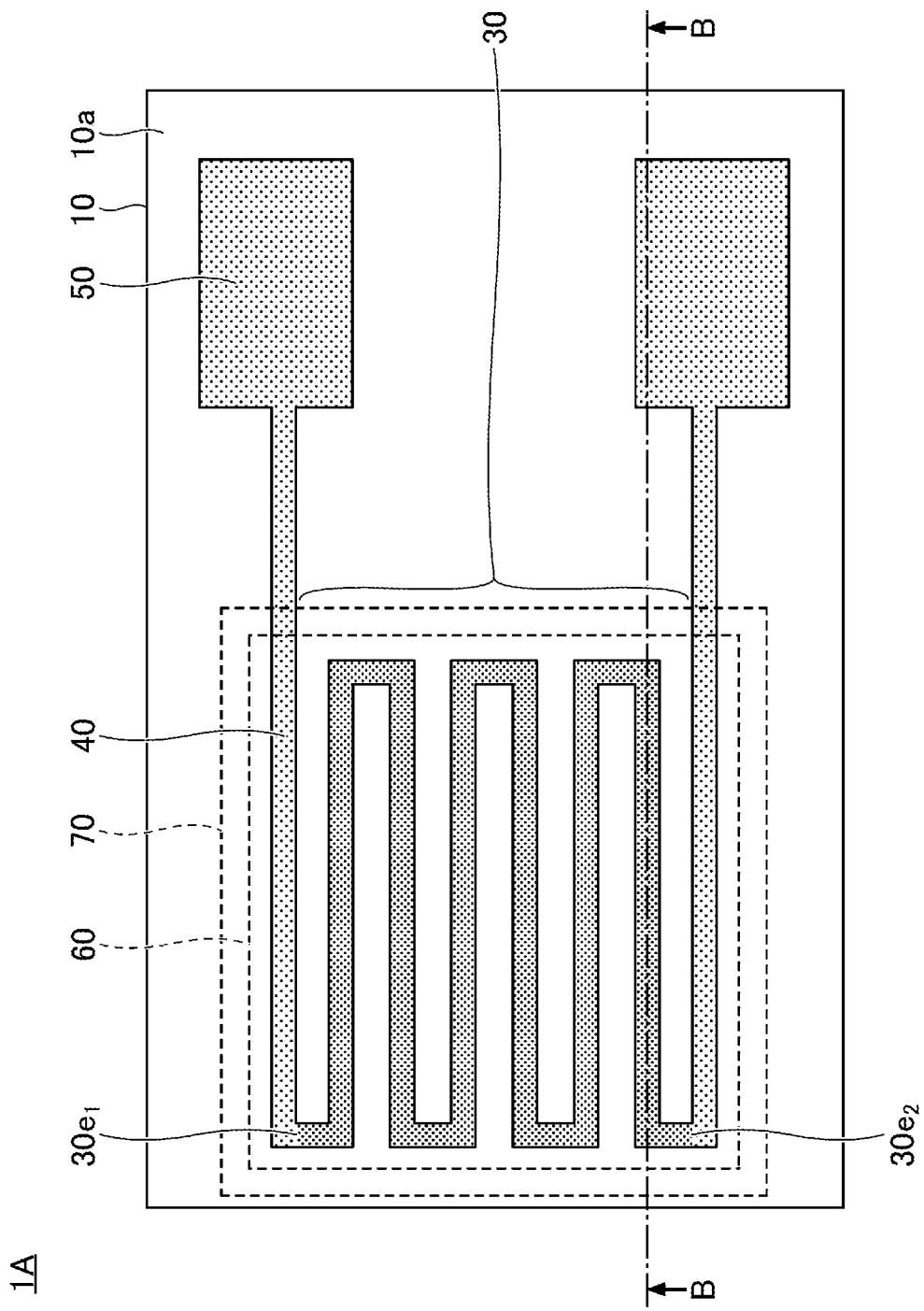
FIG. 5 is a plan view that illustrates an example of a strain gauge according to a modification 1 of the first embodiment.
Figure 6:
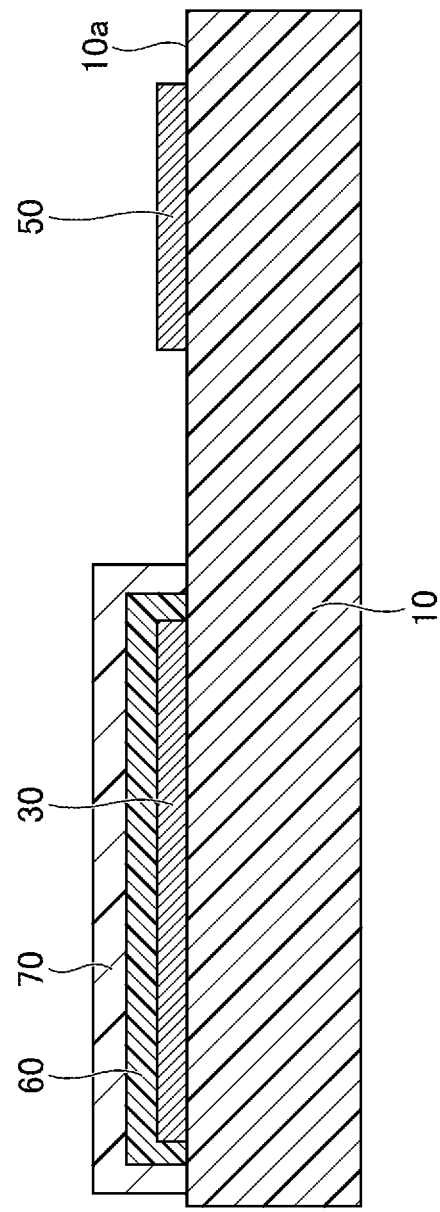
FIG. 6 is a cross-sectional view that illustrates an example of the strain gauge according to modification 1 of the first embodiment.

FIG. 5 is a diagram that illustrates an example of a strain gauge according to modification 1 of the first embodiment. FIG. 6 is a cross-sectional view that illustrates the strain gauge according to modification 1 of the first embodiment, showing a cross-section along line B-B in FIG. 5. Referring to FIG. 5 and FIG. 6, the strain gauge 1A differs from the strain gauge 1 (see FIG. 1, FIG. 2, etc.) in that it has an insulating stress relaxing layer 60.

In the strain gauge 1A, the stress relaxing layer 60 is placed between the resistor 30 and the barrier layer 70. That is, the stress relaxing layer 60 is formed to cover the resistor 30, and the barrier layer 70 is formed to cover the stress relaxing layer 60. Alternatively, the stress relaxing layer 60 may be formed only on the upper surface of the resistor 30, and the side surfaces of the resistor 30 may be directly covered with the barrier layer 70.

The stress relaxing layer 60 is made from an organic film having a lower Young's modulus than the barrier layer 70. If the barrier layer 70 has a high Young's modulus or cure-shrinkage stress, the gauge factor of the strain gauge 1A might decrease. By placing an insulating stress relaxing layer 60, made from an organic film having a lower Young's modulus than the barrier layer 70, between the resistor 30 and the barrier layer 70, the stress generated in the barrier layer 70 is relieved by the stress relaxing layer 60, and transmitted less to the resistor 30.

As a result of this, it is possible to minimize the decrease of the gauge factor of the strain gauge 1A. Considering this together with the effect of the barrier layer 70, it is possible to reduce the variation of output voltage due to the impact of leakage current, without sacrificing the gauge factor of the strain gauge 1A.

It is preferable if the coefficient of linear expansion of the stress relaxing layer 60 is close to the coefficient of linear expansion of the substrate 10. When the difference between the coefficient of linear expansion of the stress relaxing layer 60 and the coefficient of linear expansion of the substrate 10 increases, greater strain arises due to the difference in expansion in response to temperature changes, making the resistance value of the resistor 30 vary more significantly. In the meantime, making the linear expansion coefficient of the stress relaxing layer 60 close to the linear expansion coefficient of the substrate 10 brings about an effect of reducing the TCR.

Examples of materials for the stress relaxing layer 60 include organic materials such as resin and rubber. For example, the material of the stress relaxing layer 60 may be the same as the material of the substrate 10. The thickness of the stress relaxing layer 60 may be the same as the thickness of the substrate 10. The thickness of the stress relaxing layer 60 can be, for example, 2 μm or more and 500 μm or less. The stress relaxing layer 60 can be formed, for example, by the same method as that of the barrier layer 70.

Although a preferred embodiment and other forms of the present disclosure have been described above in detail as examples, the present disclosure is by no means limited to these examples, and a variety of modifications and replacements can be introduced to the above examples without departing from the scope set forth in the claims.

This international application is based and claims priority to Japanese Patent Application No. 2021-005495, filed Jan. 18, 2021, the entire contents of which are incorporated herein by reference.

REFERENCE SIGNS LIST 1, 1A strain gauge
10 substrate
10a upper surface
20 functional layer
30 resistor
$30e_1$, $30e_2$ end
40 conductive trace
50 electrode
60 stress relaxing layer
70 barrier layer

The invention claimed is:

1. A strain gauge comprising:
a flexible substrate;
a resistor made from a film containing Cr, CrN, and $Cr_2N$, on one surface of the substrate;
a barrier layer covering the resistor, the barrier layer being made of resin; and
an insulating stress relaxing layer between the resistor and the barrier layer,
wherein, in the barrier layer, a ratio of moisture permeability ($g/m^2/24h$) to thickness (mm) is 5:1 or greater, and the thickness of the barrier layer is 100 μm or more and 3 mm or less,
wherein the insulating stress relaxing layer is an organic film having a lower Young's modulus than the barrier layer.

2. The strain gauge according to claim 1, wherein the barrier layer is made from a fluoropolymer, an epoxy resin, or an acrylic resin.

3. The strain gauge according to claim 1, wherein the barrier layer covers an upper surface and side surfaces of the resistor in a continuous manner.

4. The strain gauge according to claim 1, wherein a gauge factor is 10 or more.

5. The strain gauge according to claim 1, wherein the CrN and the $Cr_2N$ contained in the resistor are 20% by weight or less.

6. The strain gauge according to claim 5, wherein a proportion of the $Cr_2N$ in the CrN and the $Cr_2N$ is 80% or more by weight and less than 90% by weight.

7. The strain gauge according to claim 1, wherein the organic film includes resin or rubber.

8. The strain gauge according to claim 1, wherein an entire material of the insulating stress relaxing layer is insulating.

9. A strain gauge comprising:
a flexible substrate;
a resistor made from a film containing Cr, CrN, and $Cr_2N$, on one surface of the substrate;
a barrier layer covering the resistor, the barrier layer being made of resin; and
an insulating stress relaxing layer between the resistor and the barrier layer,
wherein, in the barrier layer, a ratio of moisture permeability ($g/m^2/24h$) to thickness (mm) is 5:1 or greater, and the thickness of the barrier layer is 100 μm or more and 3 mm or less,
wherein an entire perimeter of the insulating stress relaxing layer is enclosed by the barrier layer.

10. A strain gauge comprising:
a flexible substrate;
a resistor made from a film containing Cr, CrN, and $Cr_2N$, on one surface of the substrate;
a barrier layer covering the resistor, the barrier layer being made of resin; and
an electrode electrically connected to the resistor, the electrode having a first sidewall facing a second sidewall of the barrier layer,
wherein, in the barrier layer, a ratio of moisture permeability ($g/m^2/24h$) to thickness (mm) is 5:1 or greater, and the thickness of the barrier layer is 100 μm or more and 3 mm or less,
wherein a portion of the flexible substrate is exposed to a gap between the first sidewall of the electrode and the second sidewall of the barrier layer.

* * * * *